United States Patent [19]

Naruoka et al.

[11] Patent Number: 4,721,073
[45] Date of Patent: Jan. 26, 1988

[54] COMPRESSION RATIO CHANGING DEVICE USING AN ECCENTRIC BEARING FOR AN INTERNAL COMBUSTION ENGINE

[75] Inventors: Takao Naruoka, Mishima; Yoshihito Moriya, Takahama, both of Japan

[73] Assignee: Toyota Jidosha Kabushiki Kaisha, Toyota, Japan

[21] Appl. No.: 890,605

[22] Filed: Jul. 30, 1986

[30] Foreign Application Priority Data

Oct. 25, 1985 [JP] Japan .............................. 60-162928[U]

[51] Int. Cl.$^4$ .............................................. F02B 75/04
[52] U.S. Cl. .............................. 123/78 BA; 123/78 E; 123/48 B
[58] Field of Search .............. 123/48 B, 78 BA, 78 E, 123/78 F, 197 AB, 197 AC

[56] References Cited

U.S. PATENT DOCUMENTS

| | | | |
|---|---|---|---|
| 1,386,114 | 8/1921 | Jedrzykowski | 123/78 E |
| 2,029,169 | 1/1936 | Hironaka | 123/48 B |
| 2,060,221 | 11/1936 | King | 123/78 F |
| 3,004,810 | 10/1961 | King | 123/78 E |
| 3,633,552 | 1/1972 | Huber | 123/48 R |
| 4,254,743 | 3/1981 | Reid et al. | 123/78 E X |

FOREIGN PATENT DOCUMENTS

| | | |
|---|---|---|
| 0040256 | 3/1980 | Japan . |
| 0064131 | 5/1980 | Japan . |
| 137832 | 3/1982 | Japan . |
| 0022172 | of 1911 | United Kingdom ........... 123/78 BA |

Primary Examiner—Willis R. Wolfe, Jr.
Attorney, Agent, or Firm—Cushman, Darby & Cushman

[57] ABSTRACT

A compression ratio changing device for an internal combustion engine using an eccentric bearing interposed between a piston-pin and a connecting rod. A lock hole is formed in the eccentric bearing and a lock-pin hole is formed in the connecting rod. A lock-pin is slidably inserted in the lock-pin hole and can move into or out of the lock hole. When the lock-pin engages lock hole, the rotation of the eccentric bearing is locked. When the lock-pin moves apart from the lock hole, the rotation of the eccentric bearing becomes free. To obtain a smooth entry of the lock-pin into the lock hole, a guide groove is formed in the outer portion of the eccentric bearing. A portion of the surface of the lock hole forms a colliding surface for colliding with the lock-pin. A deformation absorbing groove is formed at the outer portion of the colliding surface. The deformation absorbing groove absorbs a deformation of the eccentric bearing which may occur when the lock-pin is insufficiently driven toward the lock hole and the load of collision is large. Such a deformation absorbing groove increases the reliability of the operation of the compression ratio changing device.

17 Claims, 22 Drawing Figures

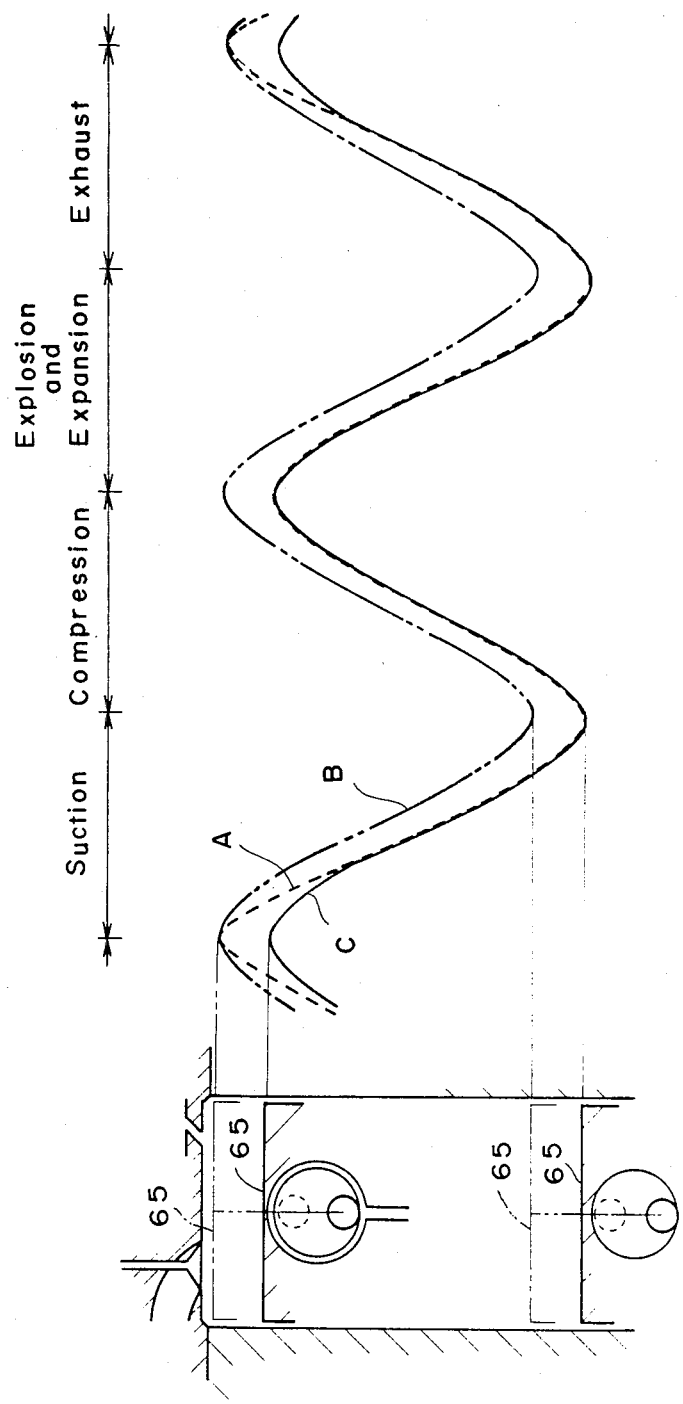

COMPRESSION RATIO CHANGING DEVICE USING AN ECCENTRIC BEARING FOR AN INTERNAL COMBUSTION ENGINE

BACKGROUND OF THE INVENTION

1. Field of the Invention:

The present invention relates to a compression ratio changing device using an eccentric bearing for an internal combustion engine in which the eccentric bearing is interposed between a piston-pin and a connecting rod and the compression ratio of the engine is changed according to the rotation of the eccentric bearing.

2. Description of the Prior Art:

In an Otto-cycle internal combustion engine it is desirable to increase the compression ratio, because an increased compression ratio brings about improved fuel efficiency as well as increased torque. However, excessively increasing the compression ratio increases probability of knocking in the engine when the gas in the combustion chamber is adiabatically compressed and the temperature of the gas rises. Knocking is liable to occur under high engine loads when an amount of air introduced into the combustion chamber is large and is less liable to occur under low engine loads when an amount of air introduced into the combustion chamber is small. Therefore, it is desirable to make the compression ratio changeable according to engine loads so that the compression ratio may be high under medium and low engine loads and may be low under high engine loads.

To satisfy these requirements various proposals have been made concerning compression ratio changing devices for an internal combustion engine. Japanese Utility Model Publication SHO No. 58-137832 discloses an eccentric bearing-type device in which the eccentric bearing having a cylindrical inside surface eccentric with respect to a cylindrical outside surface is installed between the piston-pin and the connecting rod. When the connecting rod rotates, the relative position of the piston with respect to the connecting rod is changed and the compression ratio of the engine is varied.

To explain the problems in the conventional eccentric bearing-type compression ratio changing device, the structure of the conventional device will be explained while referring to FIGS. 21 and 22. Eccentric bearing 6 having outside surface 6a and inside surface 6b is rotatably interposed between piston-pin 4 and the surface of small end hole 5 of connecting rod 3. Lock hole 9 is formed in eccentric bearing 6 and lock-pin hole 7 is formed in connecting rod 3. The centers of lock hole 9 and lock-pin hole 7 are included in a common plane which is at a right angle with respect to the axis of eccentric bearing 6. Lock-pin 8 is slidably inserted into lock-pin hole 7 to be able to move into lock hole 9. When lock-pin 8 in lock-pin hole 7 moves toward lock hole 9 and one portion of lock-pin 8 comes into engagement with lock hole 9, the rotation of eccentric bearing 6 is locked and when lock-pin 8 moves in the direction apart from lock hole 9 and disengages with lock hole 9, the rotation of eccentric bearing 6 becomes free.

When the rotation of eccentric bearing 6 is locked, the compression ratio is fixed. Since lock hole 9 is provided at such a position that lock hole 9 receives lock-pin 8 where the thickest wall portion of eccentric bearing 6 comes to the lowest position with respect to the axis of eccentric bearing 6, the fixed compression ratio is high. When the rotation of eccentric bearing 6 is unlocked, eccentric bearing 6 rotates around its axis receiving the moment which is produced by the loads on piston 2 and the arm of eccentricity of eccentric bearing 6. The loads on piston 2 include the combustion pressure, the compression force of the gas inside of cylinder block 1 and the inertia force of piston 2. When piston 2 is at T.D.C. of the compression stroke, eccentric bearing 6 rotates and naturally takes the rotational position in which the thickest wall portion of eccentric bearing 6 comes to the highest position with respect to the axis of eccentric bearing 6 and the compression ratio becomes low. In this way the compression ratio is changed by locking and unlocking the rotation of eccentric bearing 6 by means of lock-pin 8.

The driving of lock-pin 8 is performed by pressurized oil which is selectively supplied through locking oil path 10 and unlocking oil path 11 formed in connecting rod 3. When locking oil path 10 is pressurized, lock-pin 8 is driven toward lock hole 9, while unlocking oil path 11 is pressurized, lock-pin 8 is driven apart from lock hole 9.

To make the engaging of lock-pin 8 with lock hole 9 smooth, guide groove 13 is formed in the radially outer portion of eccentric bearing 6. Guide groove 13 extends circumferentially and the center of guide groove 13 is in the plane which includes the center of lock hole 9. Guide groove 13 begins at an outside surface of eccentric bearing 6 apart from lock hole 9 and becomes gradually deep toward lock hole 9 where guide groove 13 terminates. The portion of the surface of lock hole 9 opposing guide groove 13 constitutes colliding surface 14 which collides with lock-pin 8 and stops the rotation of eccentric bearing 6, thereby preventing lock-pin 8 from jumping lock hole 9 and allowing lock-pin 8 to enter lock hole 9 reliably.

However, in the compression ratio changing device having the above-mentioned structure there are the following problems.

When the compression changing mechanism is changed from the low compression ratio to the high compression ratio, lock-pin 8 is pushed toward lock hole 9 and engages with lock hole 9. In this instance, if the movement of lock-pin 8 toward lock hole 9 is not enough and accordingly lock-pin 8 collides with only the outer end portion of colliding surface 14 of eccentric bearing 6, the colliding load per a unit area of the load receiving portion of colliding surface 14 is very large and the outer end portion of colliding surface 14 will be deformed to protrude outward from outside surface of 6a eccentric bearing 6 and/or will be deformed to protrude into lock hole 9.

If the deformed portion of eccentric bearing 6 protrudes outward from the outside surface 6a of eccentric bearing 6, free rotation of eccentric bearing 6 will be deteriorated and it becomes difficult to obtain smooth changing of compression ratio and a desirable compression ratio in accordance with engine loads. If the deformed portion of eccentric bearing 6 protrudes into lock hole 9, a smooth entry of lock-pin 8 into lock hole 9 and smooth disengagement of lock-pin 8 from lock hole 9 will be deteriorated and a smooth changing of compression ratio will not be obtained.

SUMMARY OF THE INVENTION

An object of the present invention is to provide a compression ratio changing device using an eccentric bearing in which even if the colliding surface of the eccentric bearing is deformed due to the collision with a lock-pin, the deformed portion of the eccentric bearing neither protrudes radially outward from the outside surface of the eccentric bearing nor protrudes into the lock hole of the eccentric bearing.

The object is achieved, according to the present invention, by a compression ratio changing device using an eccentric bearing for an internal combustion engine in which the eccentric bearing has a cylindrical outside surface and a cylindrical inside surface eccentric with respect to the outside surface and is rotatably interposed between a piston-pin and a surface of a small end hole of a connecting rod. The compression ratio changing device includes (a) a lock hole formed in the eccentric bearing, the lock hole extending in a radial direction of the eccentric bearing, (b) a guide groove formed in a radially outer portion of the eccentric bearing, the guide groove extending in a circumferential direction of the eccentric bearing from the lock hole, (c) a colliding surface formed by one portion of a surface of the lock hole, the colliding surface being opposed to the guide groove and being positioned radially outside of a bottom of the guide groove, (d) a deformation absorbing groove formed in a radially outer portion of the eccentric bearing, the deformation absorbing means beginning from a radially outer portion of the colliding surface and extending apart from the lock hole in a circumferential direction of the eccentric bearing, the deformation absorbing groove forming a space for absorbing a deformation of the eccentric bearing in cooperation with the surface of the small end hole of the connecting rod, (e) a lock-pin hole formed in the connecting rod, the lock-pin hole extending along an extension of a radius of the eccentric bearing corresponding to a locus of rotation of the lock hole, (f) a lock-pin slidably inserted in the lock-pin hole, and (g) means for driving the lock-pin, the means being fluidly connected to the lock-pin hole.

In the device thus constructed, even if a portion of the eccentric bearing in the vicinity of the radially outer portion of the colliding surface is deformed when it collides with the lock-pin, the deformed portion only protrude into the deformation absorbing groove and such a deformation will be absorbed by the space formed between the surface if the deformation absorbing groove and the surface of the small end hole of the connecting rod. As a result, the deformed portion of the eccentric bearing neither protrudes radially outward from the outside surface of the eccentric bearing nor protrudes into the lock hole. Therefore, the rotation of the eccentric bearing and the movement of the lock-pin into or out of the lock hole can be maintained smooth.

BRIEF DESCRIPTION OF THE DRAWINGS

These and other objects and advantages of the present invention will become apparent from the following detailed description of the presently preferred exemplary embodiments of the invention taken in conjunction with the accompanying drawings, wherein:

FIG. 20 is a diagram showing a relationship between movement of a piston and time;

DETAILED DESCRIPTION OF THE PREFERRED EMBODIMENTS OF THE PRESENT INVENTION

Figure 1:
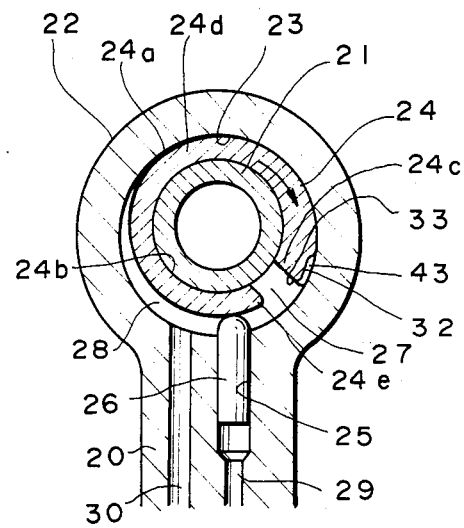
FIG. 1 is a sectional view of an eccentric bearing having a deformation absorbing groove of a first example and the vicinity of the eccentric bearing in accordance with the present invention.

FIGS. 1–16 show various eccentric bearings according to the present invention which are used for a compression ratio changing device of an internal combustion engine. These eccentric bearings differ from each other only regarding the structure of a deformation absorbing groove which will be explained later. An eccentric bearing 24 comprises a cylindrical body which has a cylindrical outside surface 24a and a cylindrical inside surface 24b eccentric with respect to outside surface 24a. Inside surface 24b rotatably contacts an outside surface of a piston-pin 21 and outside surface 24a rotatably contacts a surface of a small end hole 23 formed in a connecting rod 20. In this way, eccentric bearing 24 is rotatably interposed between piston-pin 21 and connecting rod 20.

A lock hole 27 is formed in eccentric bearing 24. Lock hole 27 radially extends with respect to a center of outside surface 24a of eccentric bearing 24 and penetrates a wall of eccentric bearing 24. Lock hole 27 is formed in the vicinity of a thickest wall portion 24c of eccentric bearing 24.

A guide groove 28 is formed in a radially outer portion of eccentric bearing 24 and opens to outside surface 24a of eccentric bearing 24. Guide groove 28 begins at a position apart from lock hole 27, of outside surface 24a of eccentric bearing 24 and extends toward lock hole 27. Guide groove 28 terminates at lock hole 27. Guide groove 28 becomes gradually deeper toward lock hole 27. A bottom surface 28a of guide groove 28 is concave toward radially outside in the axial direction of eccentric bearing 24. A transition portion 24e from guide groove 28 to lock hole 27 is rounded. Such rounded portion 24e makes the entry of a lock-pin 26 into lock hole 27 smooth.

A colliding surface 33 is provided opposed to guide groove 28. Colliding surface 33 is formed by a portion of a surface of lock hole 27 which is opposed to guide groove 28, and colliding surface 33 is positioned radially outside of a deepest portion of a bottom surface 28a of guide groove 28.

A deformation absorbing groove 32 is formed in a radially outer portion of eccentric bearing 24. Deformation absorbing groove 32 begins from the outer end portion of colliding surface 33 and extends apart from lock hole 27 in a circumferential direction of eccentric bearing 24. Deformation absorbing groove 32 forms a space 43 between the surface of deformation absorbing groove 32 and the inside surface of small end hole 23 of connecting rod 20. Space 43 absorbs a deformation of a portion of eccentric bearing 32 which is positioned near the outer portion of colliding surface 33. A connecting portion 32e of deformation absorbing groove 32 and lock hole 27 is rounded with a small radius as a chamfer to make the entry of lock-pin 26 into lock hole 27 smooth.

Deformation absorbing groove 32 can take various structures as described below.

Figure 2:
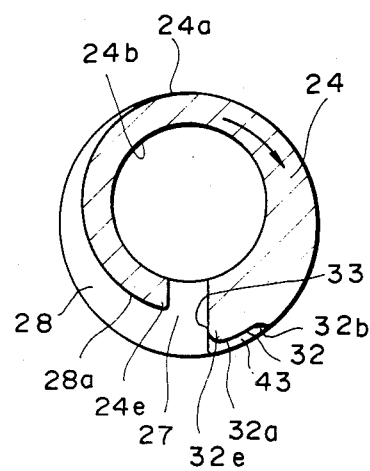
FIG. 2 is a sectional view of the eccentric bearing of FIG. 1.
Figure 3:
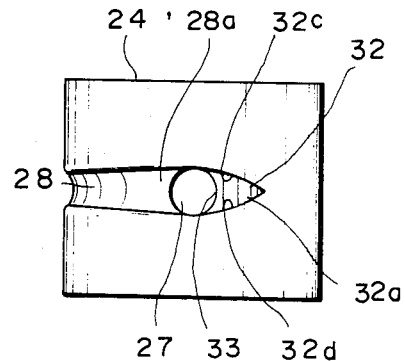
FIG. 3 is a bottom view of the eccentric bearing of FIG. 1.

FIGS. 1 to 3 show a first example of deformation absorbing groove 32. In the first example deformation absorbing groove 32 extends so short as not to reach an end of guide groove 28 in the circumferential direction of eccentric bearing 24 and terminates at outside surface 24a of eccentric bearing 24. A bottom surface 32a of deformation absorbing groove 32 is cut less deeply into outside surface 24a than a deepest portion of bottom surface 28a of guide groove 28. Bottom surface 32a of deformation absorbing groove 32 extends circumferentially along and in parallel with outside surface 24a of eccentric bearing 24 and terminates at a curved connecting surface 32b. Curved connecting surface 32b connects an end of bottom surface 32a and outside surface 24a of eccentric bearing 24. Both side surfaces 32c and 32d of deformation absorbing groove 32 are apart from each other by the diameter of lock hole 27 at the beginning position of deformation absorbing groove 32 and the distance between side surfaces 32c and 32d becomes gradually small toward the terminating position of deformation absorbing groove 32 where the distance becomes zero.

Figure 4:
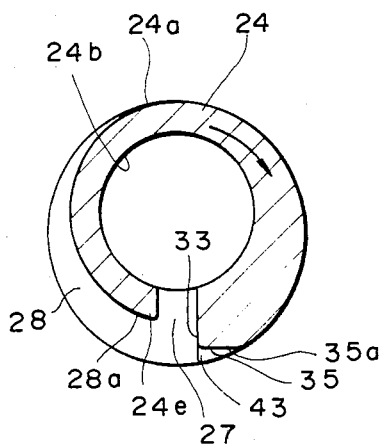
FIG. 4 is a sectional view of the eccentric bearing having a deformation absorbing groove of a second example in accordance with the present invention.
Figure 5:
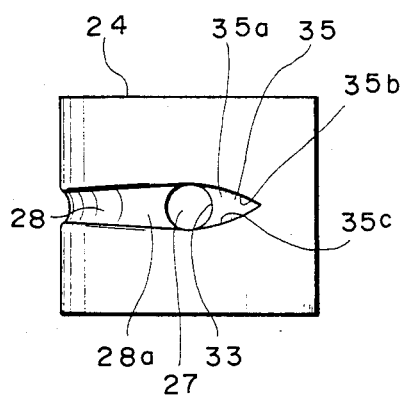
FIG. 5 is a bottom view of the eccentric bearing of FIG. 4.

FIGS. 4 and 5 show a second example of the deformation absorbing groove. In the second example a deformation absorbing groove 35 extends so short as not to reach the end of guide groove 28 in the circumferential direction of eccentric bearing 24. Deformation absorbing groove 35 has a bottom surface 35a which is a flat plane and extends straight from lock hole 27 up to outside surface 24a of eccentric bearing 24. Bottom surface 35a of deformation absorbing groove 35 is cut less deeply into outside surface 24a than the deepest portion of bottom surface 28a of guide groove 28. Side surfaces 35b and 35c of deformation absorbing groove 35 are apart from each other by the diameter of lock hole 27 at the beginning position of deformation absorbing groove 35 and the distance between side surfaces 35b and 35c becomes gradually small toward the terminating position of deformation absorbing groove 35 where the distance becomes 0.

Figure 6:
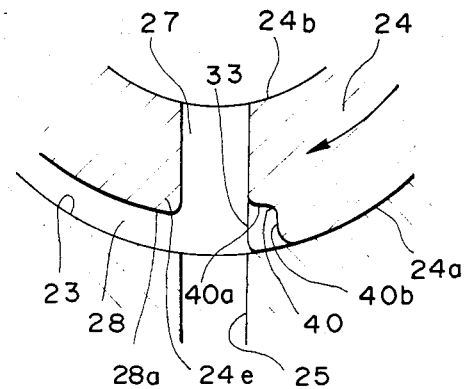
FIG. 6 is a partial sectional view of the eccentric bearing having a deformation absorbing groove of a third example in accordance with the present invention.
Figure 7:
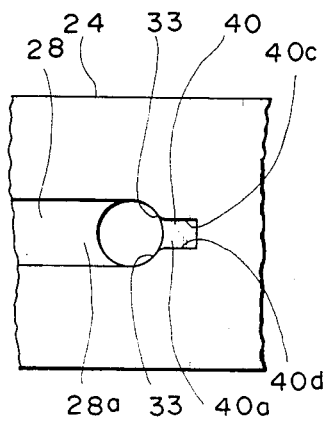
FIG. 7 is a bottom view of the eccentric bearing of FIG. 6.

FIGS. 6 and 7 show a third example of the deformation absorbing groove. In the third example a deformation absorbing groove 40 extends so short as not to reach the end of guide groove 28 in the circumferential direction of eccentric bearing 24. Deformation absorbing groove 40 has a bottom surface 40a which is cut to nearly the same depth as the deepest portion of bottom surface 28a of guide groove 28 and a connecting surface 40b which extends radially outward from an end of bottom surface 40a to outside surface 24a of eccentric bearing 24. Both side surfaces 40c and 40d of deformation absorbing groove 40 are apart from each other by a distance which is smaller than the diameter of lock hole 27 and extend in parallel with each other.

Figure 8:
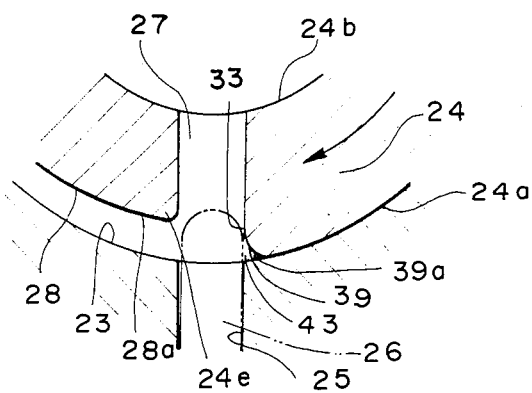
FIG. 8 is a partial sectional view of the eccentric bearing having a deformation absorbing groove of a fourth example in accordance with the present invention.

FIG. 8 shows a fourth example of the deformation absorbing groove. In the fourth example a deformation absorbing groove 39 extends so short as not to reach the end of guide groove 28 in the circumferential direction of eccentric bearing 24. Deformation guide groove 39 has a rounded surface 39a which is convex toward space 43. Rounded surface 39a has a radius larger than the radius of the rounded portion 32e as a chamfer of example 1. One end of rounded surface 39a is smoothly connected to lock hole 27 at nearly the same radial position as the deepest portion of bottom surface 28a of guide groove 28 and the other end of rounded surface 39a is smoothly connected to outside surface 24a of eccentric bearing 24.

Figure 9:
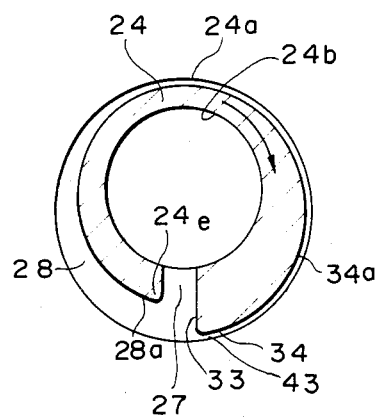
FIG. 9 is a sectional view of the eccentric bearing having a deformation absorbing groove of a fifth example in accordance with the present invention.
Figure 10:
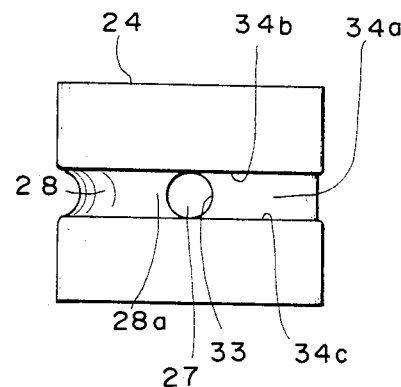
FIG. 10 is a bottom view of the eccentric bearing of FIG. 9.

FIGS. 9 and 10 show a fifth example of the deformation absorbing groove. In the fifth example a deformation absorbing groove 34 begins from lock hole 27 and extends circumferentially up to the end of guide groove 28 where deformation absorbing groove 34 is integrally connected to guide groove 28. Deformation absorbing groove 34 has a constant depth and guide groove 28 has a gradually changing depth. A bottom surface 34a of deformation absorbing groove 34 is a cylindrical surface having a common axis with outside surface 24a of eccentric bearing 24. Bottom surface 34a of deformation absorbing groove 34 is not cut as deep as the deepest portion of bottom surface 28a of guide groove 28. Side surfaces 34b and 34c of deformation absorbing groove 34 are spaced from each other by the diameter of lock hole 27 and extend in parallel with each other in the circumferential direction of eccentric bearing 24.

Figure 11:
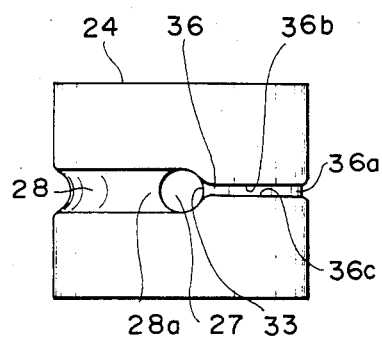
FIG. 11 is a bottom view of the eccentric bearing having a deformation absorbing groove of a sixth example in accordance with the present invention.

FIG. 11 shows a sixth example of the deformation absorbing groove. In the sixth example a deformation absorbing groove 36 has the same construction as that of deformation absorbing groove 34 of the fifth example except that a distance between side surfaces 36b and 36c of deformation absorbing groove 36 is smaller than the diameter of lock hole 27.

Figure 12:
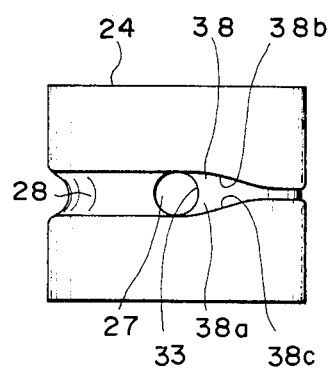
FIG. 12 is a bottom view of the eccentric bearing having a deformation absorbing groove of a seventh example in accordance with the present invention.

FIG. 12 shows a seventh example of the deformation absorbing groove. In the seventh example a deformation absorbing groove 38 has the same construction as that of deformation absorbing groove 34 of the fifth example except that a distance between side surfaces 38b and 38c of absorbing groove 38 becomes gradually small toward the direction apart from lock hole 27.

Figure 13:
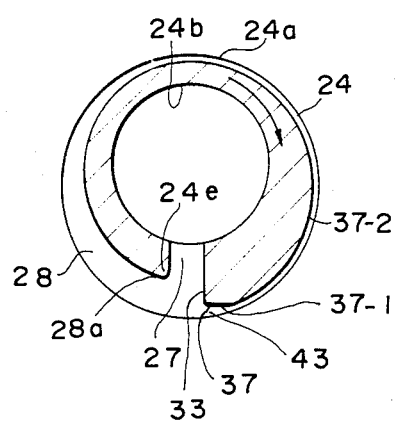
FIG. 13 is a sectional view of the eccentric bearing having a deformation absorbing groove of an eighth example in accordance with the present invention.
Figure 14:
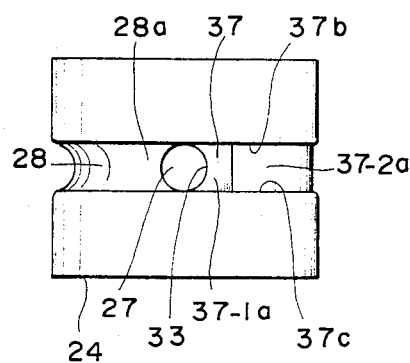
FIG. 14 is a bottom view of the eccentric bearing of FIG. 13.

FIGS. 13 and 14 show an eighth example of the deformation absorbing groove. In the eighth example a deformation absorbing groove 37 begins from lock hole 27 and extends circumferentially up to the end of guide groove 28 where deformation absorbing groove 37 is integrally connected to guide groove 28. Deformation absorbing groove 37 has a portion 37-1 which has a flat bottom surface 37-1a and a portion 37-2 which has a cylindrical bottom surface 37-2a concentric with respect to outside surface 24a of eccentric bearing 24. Portion 37-1 begins from lock hole 27 and extends up to one end of portion 37-2. Portion 37-2 extends between portion 37-1 and guide groove 28 and has a constant depth. Bottom surface 37-1a of deformation absorbing groove 37 is not cut as deeply as the deepest portion of bottom surface 28a of guide groove 28. Side surfaces 37b and 37c of deformation absorbing groove 37 are in parallel with each other and are spaced from each other by the diameter of lock hole 27.

Figure 15:
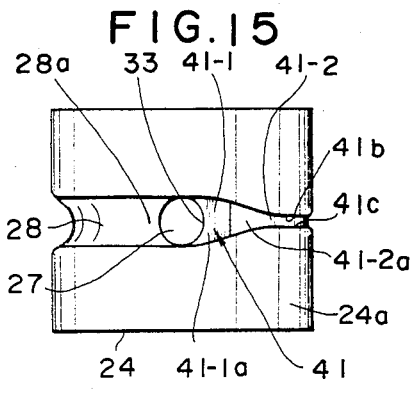
FIG. 15 is a bottom of the eccentric bearing having a deformation absorbing groove of a ninth example in accordance with the present invention.

FIG. 15 shows a ninth example of the deformation absorbing groove. In the ninth example a deformation absorbing groove 41 has a portion 41-1 with a flat bottom surface 41-1a and a portion 41-2 with a cylindrical bottom surface 41-2a. Side surfaces 41b and 41c of deformation absorbing groove 41 are in parallel with each other and a distance between side surfaces 41b and 41c is smaller than the diameter of lock hole 27. A deepest portion of bottom surface 41-1a deformation absorbing groove 41 is positioned radially outer than the deepest portion of bottom surface 28a of guide groove 28.

Figure 16:
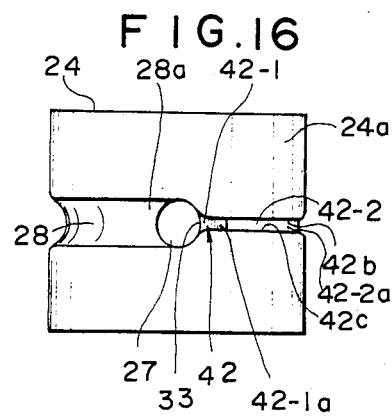
FIG. 16 is a bottom view of the eccentric bearing having a deformation absorbing groove of a tenth example in accordance with the present invention.
Figure 21:
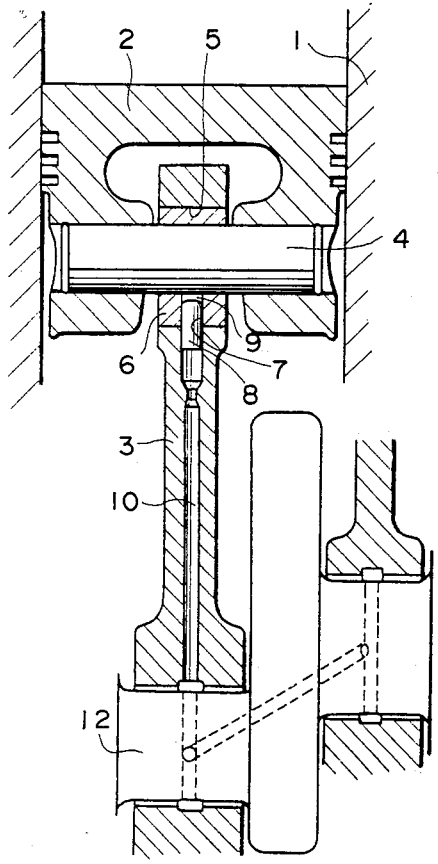
FIG. 21 is a sectional view of the eccentric bearing and the vicinity thereof disclosed in Japanese Utility Model Publication SHO No. 58-137832.
Figure 22:
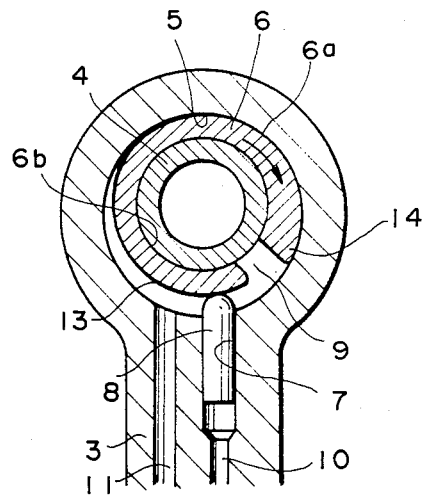
FIG. 22 is is a transverse sectional view of the eccentric bearing of FIG. 21.
Figure 17:
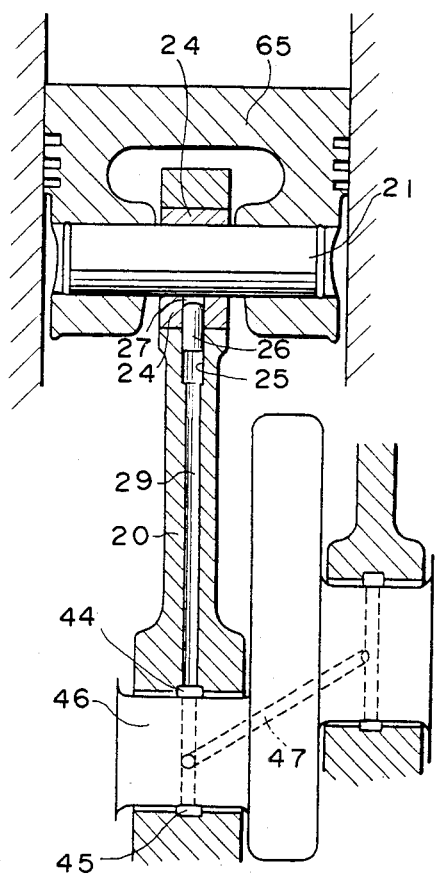
FIG. 17 is a sectional view of a compression ratio changing device including the eccentric bearing of the present invention and means for driving a lock-pin.
Figure 18:
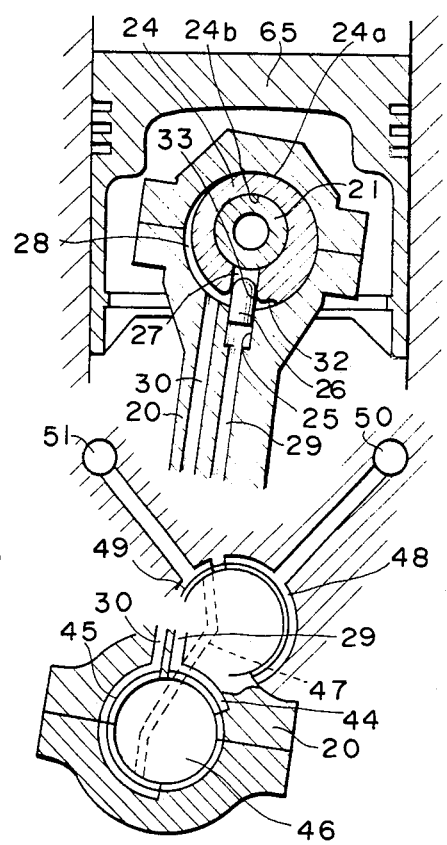
FIG. 18 is a transverse sectional view of the device of FIG. 17.
Figure 19:
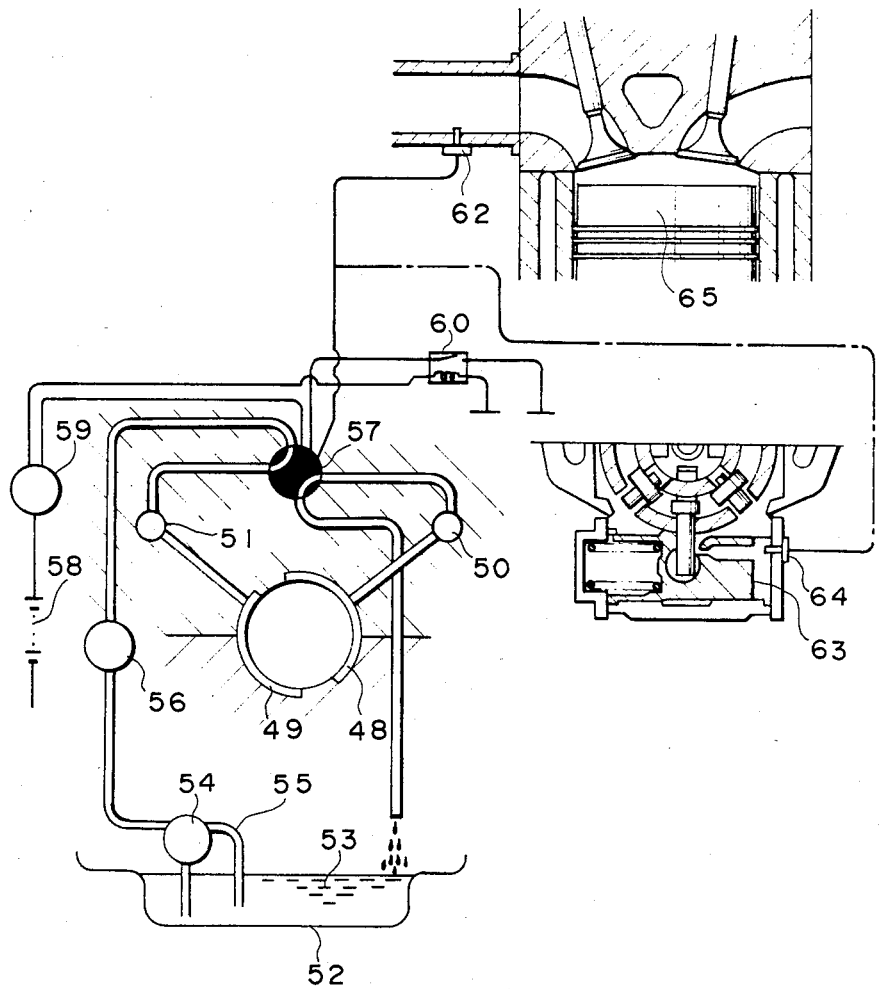
FIG. 19 is a diagram of an oil circuit for driving the lock-pin, connected to the device of FIG. 18.

FIG. 16 shows a tenth example of the deformation absorbing groove. In the tenth example a deformation absorbing groove 42 has a portion 42-1 with a flat bottom surface 42-1a and a portion 42-2 with a cylindrical bottom surface 42-2a. Side surfaces 42b and 42c of deformation absorbing groove 42 are in parallel with each other and a distance between side surfaces 42b and 42c becomes gradually small toward the direction apart from lock hole 27. A deepest portion of bottom surface 42-1a of deformation absorbing groove 42 is not cut as deeply as the deepest portion of bottom surface 28a of guide groove 28.

As illustrated in FIG. 1, a lock-pin hole 25 is formed in connecting rod 20 and opens to the surface of small end hole 23. Lock-pin hole 25 is provided on a locus of rotation of lock hole 27 and extends in an extension of a radius of outside surface 24a of eccentric bearing 24.

Lock-pin 26 is slidably inserted in lock-pin hole 25. Lock-pin 26 can move into lock hole 27 of eccentric bearing 24 when lock hole 27 comes to lock-pin hole 25 due to the rotation of eccentric bearing 24. When lock-pin 26 is driven toward lock hole 27 and a portion of lock-pin 26 is brought into engagement with lock hole 27, the rotation of eccentric bearing 24 is locked. On the contrary, when lock-pin 26 is driven apart from lock hole 27 and the engagement of lock-pin 26 with lock hole 27 is unlocked, the rotation of eccentric bearing 24 becomes free. One end of lock-pin 26 is rounded to make the entry of lock-pin 26 into lock hole 27 smooth.

A lock-pin driving means is formed in connecting rod 20. The lock pin driving means comprises a locking oil path 29 and an unlocking oil path 30 which extend from a small end portion to a large end portion of connecting rod 20. Locking oil path 29 is connected to a bottom portion of lock-pin hole 25. When locking oil path 29 is pressurized, lock-pin 26 is driven toward eccentric bearing 24. Unlocking oil path 30 is opened to the surface of small end hole 23 of connecting rod 20 and can be fluidly connected to lock hole 27 via guide groove 28. When unlocking oil path 30 is pressurized, lock-pin 26 is driven to move apart from eccentric bearing 24.

An axis of first lock hole 27, a center of guide groove 28 and a center of colliding surface 33 are included in a common plane which is at a right angle with respect to a longitudinal axis of eccentric bearing 24. The center of each deformation absorbing groove 32, 34, 35, 36, 37, 38, 39, 40, 41 or 42 of the first to tenth examples is in the plane which includes the center of lock hole 27.

A circuit for driving lock-pin 26 and its operation is shown in FIGS. 17 to 20. Locking oil path 29 and unlocking oil path 30 are fluidly connected to oil grooves 44 and 45 which are formed independent of each other on a bearing portion of the large end portion of connecting rod 20. Oil grooves 44 and 45 are fluidly connected to oil grooves 48 and 49, independent of each other, formed in a bearing portion for supporting a crank shaft 46 via a single oil hole 47 formed in a crank shaft 46. Oil grooves 44 and 45 are intermittently connected to grooves 48 and 49, respectively, according to the rotation of crank shaft 46. In detail, oil groove 48 can intermittently be connected to locking oil path 29 via oil hole 47 and oil groove 44, and oil groove 49 can intermittently be connected to unlocking oil path 30 via oil hole 47 and oil groove 45.

An oil path 50 for a high compression ratio and an oil path 51 for a low compression ratio are formed in a cylinder block. Oil path 50 for the high compression ratio is fluidly connected to oil groove 48 and oil path 51 for the low compression ratio is fluidly connected to oil groove 49. Oil 53 in an oil pan 52 is pumped up to a main oil hole formed in the cylinder block by an oil pump 56 via an oil strainer 54 and a return pipe 55 for releasing overly pressurized oil to oil pan 52. Oil 53 in the main oil hole is selectively sent via switching valve 57 to either oil path 50 for the high compression ratio or oil path 51 for the low compression ratio. A battery 58, an ignition switch 59, a relay 60 for sensing a start signal of the engine, a pressure switch 62 acting by a negative pressure of an intake manifold in the case of a gasoline engine, and a pressure switch 64 provided in a pumping chamber 63 of a fuel injection pump in the case of a diesel engine are connected. These elements are operated to switch switching valve 57 according to engine operating conditions such that a pressurized oil is selectively sent to oil path 51 for the low compression ratio under high engine loads and sent to oil path 50 for the high compression ratio under low engine loads.

Next, the operation of the embodiment thus constructed will be explained.

When the engine is under high loads and a low compression ratio should be obtained, the pressurized oil is selectively sent to oil path 51 for the low compression ratio by switching valve 57 and further sent via oil groove 49, oil hole 47 in crank shaft 46 and oil groove 45 to unlocking oil path 30. The pressurized oil in unlocking oil path 30 drives lock-pin 26 apart from eccentric bearing 24 and allows the entire portion of lock-pin 26 to be housed in lock-pin hole 25. When the engagement of lock-pin 26 with lock hole 27 in eccentric bearing 24 is relieved, the rotation of eccentric bearing 24 is unlocked. Since the rotation of eccentric bearing 24 is free in the unlocked state, eccentric bearing 24 rotates around its axis when it receives the loads from a piston 65, that is, a pressurized gas pressure, a combustion pressure and an inertia force of piston 65. Thus, piston 65 moves according to a line A of FIG. 20. As a result, piston 65 naturally takes the lowest position with respect to connecting rod 20 and the state of low compression ratio is obtained. Therefore, knocking is prevented and improvements in fuel efficiency and axial torque can be obtained.

On the contrary, when the engine is under low loads and a high compression ratio should be obtained, the pressurized oil is selectively sent to oil path 50 for the high compression ratio by switching valve 57 and further sent via oil groove 48, oil hole 47 in crank shaft 46 and oil groove 44 to locking oil path 29. The pressurized oil in locking oil path 29 drives lock-pin 26 toward eccentric bearing 24 and allows lock-pin 26 to engage with lock hole 27 in eccentric bearing 24 in rotating, thereby the rotation of eccentric bearing 24 is locked. Since the relative position of piston 65 with respect to connecting rod 20 is locked at a high position by locking eccentric bearing 24, a high compression ratio can be produced. In the locking state, piston 65 moves according to a line B of FIG. 20. A line C of FIG. 20 shows a movement of piston 65 which would be obtained if the rotation of eccentric bearing 24 was locked under a low compression ratio state. As a result, a high compression ratio can be obtained under low engine loads and improvements in fuel efficiency and axial torque can be obtained.

In the above locking of the rotation of eccentric bearing 24, it should be noted that lock-pin 26 may not be driven sufficiently toward eccentric bearing 24 and only one portion of colliding surface 33 of eccentric bearing 24 may collide with lock-pin 26. In such a case, since the load receiving area of colliding surface 33 is small, loads per a unit area of the load receiving portion is very high and therefore, a radially outer portion of colliding surface 33 may be deformed. The deformed portion of eccentric bearing 24 will protrude into groove 32, 34, 35, 36, 37, 38, 39, 40, 41 or 42 and will be absorbed in space 43. Thus, the deformed portion neither protrudes outward from outside surface 24a of eccentric bearing 24 nor protrudes into lock hole 27. As a result, a reliable rotation of eccentric bearing 24 and a reliable engagement or disengagement of lock-pin 26 with lock hole 27 can be obtained. The reliable operation of eccentric bearing 24 and lock-pin 26 ensures a smooth operation of the compression ratio changing mechanism.

In manufacturing eccentric bearing 24, since the bottom surface of the deformation absorbing groove is formed in a simple shape such as a cylindrical surface, a flat surface or a rounded surface and/or a combination thereof, machining is very easy and practical. In addition, since there is no necessity to use a hard material such as ceramics for eccentric bearing 24 for the purpose of preventing a deformation of eccentric bearing 24 and steel can be used as a material of eccentric bearing 24, the cost of eccentric bearing is of a small one.

Although only several preferred embodiments of the present invention have been described in detail, it will be appreciated by those skilled in the art that various modifications can be made to the particular embodiments shown without materially departing from the novel teachings and advantages of the present invention. Accordingly, it is to be understood that all such modifications and alterations are included within the scope of the present invention as defined by the following claims.

What is claimed is:

1. A compression ratio changing device for an internal combustion engine comprising:
   a connecting rod defining a lock-pin hole therein, the lock-pin hole opening at a small end hole of the connecting rod and extending along an extension of a radius of the small end hole;
   a piston-pin extending through the small end hole;
   an eccentric bearing rotatably interposed between the connecting rod and the piston-pin, the eccentric bearing having a cylindrical outside surface and a cylindrical inside surface eccentric with respect to the outside surface, the eccentric bearing defining: (a) a lock hole extending in a radial direction of the eccentric bearing, (b) a guide groove formed in a radially outer portion of the eccentric bearing, the guide groove extending in a circumferential direction of the eccentric bearing from the lock hole, (c) a colliding surface formed by one portion of a surface of the lock hole, the colliding surface being opposed to the guide groove and extending radially outwardly further than a deepest portion of a bottom surface of the guide groove, and (d) a deformation absorbing groove formed in a radially outer portion of the eccentric bearing, the deformation absorbing groove beginning from the lock hole and extending away from the lock hole in a circumferential direction of the eccentric bearing, the deformation absorbing groove forming a space for absorbing a deformation of the eccentric bearing in cooperation with a surface of the connecting rod;
   a lock-pin slidably inserted in the lock-pin hole; and
   means for driving said lock-pin, the means being fluidly connected to the lock-pin hole.

2. The device of claim 1, wherein the deformation absorbing groove terminates at the outside surface of the eccentric bearing between the lock hole and an end of the guide groove and has a bottom surface and side surfaces.

3. The device of claim 2, wherein the bottom surface of the deformation absorbing groove is a cylindrical surface having a common axis with the outside surface of the eccentric bearing and terminates at a curved connecting surface which connects the bottom surface of the deformation absorbing groove to the outside surface of the eccentric bearing, the bottom surface of the deformation absorbing groove being less deeper into the eccentric bearing than a deepest portion of a bottom surface of the guide groove, and wherein the side surfaces of the deformation absorbing groove are apart from each other by the diameter of the lock hole at the beginning position of the deformation absorbing groove and the distance between the side surfaces becomes gradually smaller toward the terminating position of the deformation absorbing groove where the distance becomes zero.

4. The device of claim 2, wherein the bottom surface of the deformation absorbing groove is flat and extends straight from the lock hole up to the outside surface of the eccentric bearing, the bottom surface of the deformation absorbing groove being positioned less deep into the eccentric bearing than a deepest portion of a bottom surface of the guide groove, and wherein the side surfaces of the deformation absorbing groove are apart from each other by the diameter of the lock hole at the beginning position of the deformation absorbing groove and the distance between the side surfaces becomes gradually smaller toward the terminating position of the deformation absorbing groove where the distance becomes zero.

5. The device of claim 2, wherein the bottom surface of the deformation absorbing groove is positioned substantially as deep in the eccentric bearing as a deepest portion of a bottom surface of the guide groove and terminates at a connecting surface which extends radially outward from the end of the bottom surface to the outside surface of the eccentric bearing, and wherein the side surfaces of the deformation absorbing groove are apart from each other by a distance which is smaller than the diameter of the lock hole and extend in parallel with each other.

6. The device of claim 2, wherein the deformation absorbing groove has a cylindrically rounded surface which is convex toward the space formed between the surface of the deformation absorbing groove and the surface of the connecting rod, one end of the rounded surface being smoothly connected to the lock hole at substantially the same depth as a deepest portion of a bottom surface of the guide groove and the other end of the rounded surface being smoothly connected to the outside surface of the eccentric bearing.

7. The device of claim 1, wherein the deformation absorbing groove extends circumferentially up to an end of the guide groove and is connected to the guide groove.

8. The device of claim 7, wherein a bottom surface of the deformation absorbing groove is a cylindrical surface over an entire length of the deformation absorbing groove and is less deep into the eccentric bearing than a deepest portion of a bottom surface of the guide groove, and wherein side surfaces of the deformation absorbing groove are spaced from each other by the diameter of the lock hole and extend in parallel with each other in the circumferential direction of the eccentric bearing.

9. The device of claim 7, wherein a bottom surface of the deformation absorbing groove is a cylindrical surface over an entire length of the deformation absorbing groove and is less deep into the eccentric bearing than a deepest portion of a bottom surface of the guide groove, and wherein side surfaces of the deformation absorbing groove are spaced from each other by a distance smaller than the diameter of the lock hole and extend in parallel with each other in the circumferential direction of the eccentric bearing.

10. The device of claim 7, wherein a bottom surface of the deformation absorbing groove is a cylindrical surface over an entire length of the deformation absorbing groove and is less deep into the eccentric bearing than a deepest portion of a bottom surface of the guide groove, and wherein side surfaces of the deformation absorbing groove are spaced from each other by the diameter of the lock hole at the beginning position of the deformation absorbing groove and a width of the deformation absorbing groove becomes gradually smaller toward the direction away from the lock hole.

11. The device of claim 1, wherein the deformation absorbing groove extends up to an end of the guide groove and includes a first portion with a flat bottom surface and a second portion with a cylindrical bottom surface, the bottom surface of the first portion being less deep into the eccentric bearing than a deepest portion of a bottom surface of the guide groove.

12. The device of claim 11, wherein side surfaces of the deformation absorbing groove are in parallel with each other and are spaced from each other by the diameter of the lock hole over an entire length of the deformation absorbing groove.

13. The device of claim 11, wherein side surfaces of the deformation absorbing groove are in parallel with each other and are spaced from each other by a distance smaller than the diameter of the lock hole over an entire length of the deformation absorbing groove.

14. The device of claim 1, wherein side surfaces of the deformation absorbing groove are spaced from each other by the diameter of the lock hole at the beginning position of the deformation absorbing groove and a width of the deformation absorbing groove becomes gradually smaller toward the direction away from the lock hole.

15. The device of claim 1, wherein centers of the lock hole, the guide groove, the colliding surface, the lock-pin hole, the lock-pin and the deformation absorbing groove are included in a single common plane which is at a right angle with respect to an axis of the eccentric bearing.

16. The device of claim 1, wherein the guide groove becomes gradually deeper toward the lock hole and has a bottom surface which is concave in an axial direction of the eccentric bearing.

17. The device of claim 1, wherein the lock hole is provided at a vicinity of a thickest wall portion of the eccentric bearing.

* * * * *